United States Patent [19]

Kiyonaga

[11] Patent Number: 4,577,931

[45] Date of Patent: Mar. 25, 1986

[54] LIQUID CRYSTAL COMPOSITION

[75] Inventor: Bunzo Kiyonaga, Shiojiri, Japan

[73] Assignee: Epson Corporation, Nagano, Japan

[21] Appl. No.: 497,532

[22] Filed: May 24, 1983

[30] Foreign Application Priority Data

May 26, 1982 [JP] Japan .................................. 57-89296

[51] Int. Cl.$^4$ ............................ C09K 3/34; G02F 1/13
[52] U.S. Cl. ............................ 350/350 R; 252/299.61;
252/299.63; 252/299.67
[58] Field of Search ....................... 252/299.61, 299.63,
252/299.67; 350/350 R

[56] References Cited

U.S. PATENT DOCUMENTS

| | | | |
|---|---|---|---|
| 3,953,491 | 4/1976 | Steinstrasser et al. | 252/299.64 |
| 4,229,315 | 10/1980 | Krause et al. | 252/299.63 |
| 4,309,304 | 1/1982 | Harrison et al. | 252/299.63 |
| 4,313,878 | 2/1982 | Hsu | 252/299.61 |
| 4,322,354 | 3/1982 | Sorkin | 252/299.61 |
| 4,323,471 | 4/1982 | Sethofer | 252/299.61 |
| 4,323,472 | 4/1982 | Sethofer | 252/299.61 |
| 4,328,116 | 5/1982 | Harrison | 252/299.64 |
| 4,364,838 | 12/1982 | Boller et al. | 252/299.61 |
| 4,372,871 | 2/1983 | Toriyama et al. | 252/299.61 |
| 4,410,445 | 10/1983 | Baur et al. | 252/299.5 |

FOREIGN PATENT DOCUMENTS

| | | | |
|---|---|---|---|
| 74608 | 3/1983 | European Pat. Off. | 252/299.63 |
| 2934918 | 3/1980 | Fed. Rep. of Germany | 252/299.63 |
| 56-2371 | 1/1981 | Japan | 252/299.63 |
| 56-149488 | 11/1981 | Japan | 252/299.63 |
| 56-149487 | 11/1981 | Japan | 252/299.63 |
| 57-85881 | 5/1982 | Japan | 252/299.61 |
| 1376115 | 1/1973 | United Kingdom | 252/299.67 |
| 2017742 | 10/1979 | United Kingdom | 252/299.63 |
| 2028363 | 3/1980 | United Kingdom | 252/299.63 |
| 2067586 | 7/1981 | United Kingdom | 252/299.61 |
| 2086385 | 5/1982 | United Kingdom | 252/299.63 |

*Primary Examiner*—Teddy S. Gron
*Attorney, Agent, or Firm*—Blum, Kaplan, Friedman, Silberman & Beran

[57] ABSTRACT

Liquid crystal display devices including liquid crystal compositions of cyclohexanecarboxylic esters and esters having an acyloxy group have excellent time-sharing characteristics, low duty ratio and driving voltage.

25 Claims, 3 Drawing Figures

LIQUID CRYSTAL COMPOSITION

BACKGROUND OF THE INVENTION

This invention relates to nematic liquid crystal compositions having positive dielectric anisotropy and no visible light absorption. More particularly, it is directed to a nematic liquid crystal composition including primarily liquid crystals of a cyclohexanecarboxylic ester and an ester having an acyloxyl group. These compositions have improved time-sharing characteristics which permit satisfactory time-sharing operation with a duty ratio of up to at least 1/32 at a voltage not exceeding 10 volts.

Twisted nematic liquid crystal display devices can be driven in a static or time-sharing mode. Time-sharing driven systems require a reduced number of leads and therefore are advantageous, since they (1) simplify the construction of a liquid crystal cell, (2) reduce the number of connections between the liquid crystal cell and the output of a driving circuit, and (3) simplify the construction of the driving circuit. Large-capacity display devices require operation in a time-sharing mode at a low duty ratio as the number of leads increases.

In liquid crystal display devices operating in a time-sharing mode, the driving voltage which may be applied to the liquid crystal is limited. A driving voltage which provides satisfactory liquid crystal display contrast and angle of vision is at least about the threshold voltage for obtaining a light transmittance of 30 percent. This driving voltage may vary as a result of factors such as change in battery voltage over the useful life of the battery and variations in circuit design. Accordingly, circuits are designed to operate within a voltage margin M, which is a measure of allowable fluctuations in driving voltage.

In liquid crystal display devices, selective and half-selective waveforms have an effective voltage ratio which usually decreases with a reduction in the duty ratio. There is a decrease in the difference between the threshold voltage for light transmittance of 30 percent and 80 percent, and therefore, a reduction in the voltage margin M. If the duty ratio is even further reduced, the threshold voltage for 30 percent transmittance will become greater than that for 80 percent transmittance, and the voltage margin will become negative. Under such circumstances, the duty ratio makes operation in the time-sharing mode impossible.

Many conventional liquid crystal compositions consist mainly of an azoxy liquid crystal, which deteriorates in visible light and, in consequence, reduces the quality of the display. To overcome this problem, the display devices incorporates a yellow filter to block the harmful light rays. Thus, these displays are possible only in a yellow color and not in other colors.

Various non-azoxy liquid crystals are known which do not require a yellow filter. These liquid crystals include primarily liquid crystals compound of the following structural formulas:

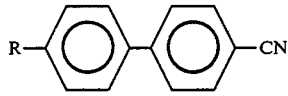

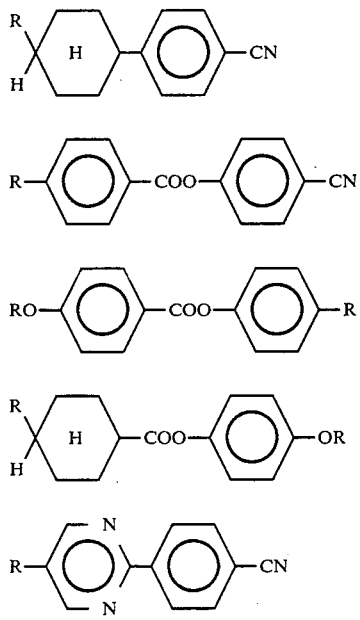

where R stands for a straight-chain alkyl group. A liquid crystal mixture composed of any of these liquid crystal compounds results in a negative voltage margin in a time-sharing operation with a duty ratio lower than 1/16. These compositions are not suitable for a large-capacity display, since it is impossible to operate in the time-sharing mode with such a duty ratio.

Accordingly, there exists a need for an improved twisted nematic liquid crystal display device having a large-capacity, high-quality display, employing a liquid crystal composition which allows a time-sharing operation having a lower duty ratio and wider voltage margin than heretofore possible.

SUMMARY OF THE INVENTION

Liquid crystal compositions which may be utilized in a display device and having excellent time-sharing characteristics and a duty ratio from 1/32 to 1/48 and driven at a low voltage comprise an appropriate combination of the compounds of the formulas (1) to (6):

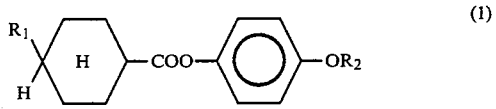
(1)

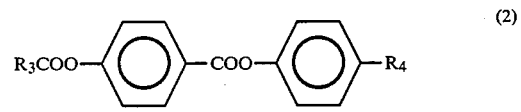
(2)

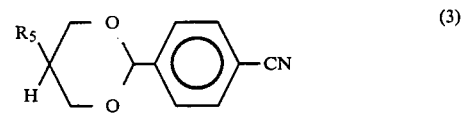
(3)

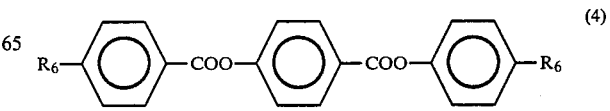
(4)

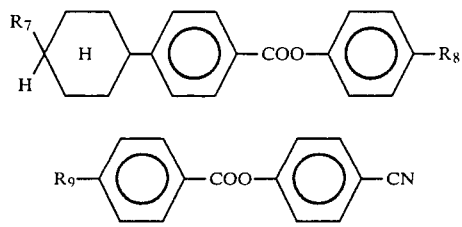

wherein $R_1$ is a straight-chain alkyl group having 2 to 6 carbon atoms; $R_2$ is a straight-chain alkyl group having 1 to 6 carbon atoms; $R_3$ is a straight-chain alkyl group having 3 to 6 carbon atoms; $R_4$ is a straight-chain alkyl group having 1 to 5 carbon atoms; $R_5$ is a straight-chain alkyl group having 2 to 8 carbon atoms; $R_6$ is a straight-chain alkyl group having 2 to 4 carbon atoms; $R_7$ is a straight-chain alkyl group having 3 to 5 carbon atoms; $R_8$ is a straight-chain alkyl group having 2 to 7 carbon atoms, and $R_9$ is a straight-chain alkyl group having 2 to 8 carbon atoms.

Large-capacity displays including a liquid crystal composition of appropriate combinations of these formulas have a lower driving voltage, wider angles of vision, lessened cross-talk at a small angle of vision, improved contrast and do not require a yellow filter.

Accordingly, it is an object of the invention to provide an improved liquid crystal composition.

A further object of the invention is to provide an improved liquid crystal composition for use in large-capacity display devices.

Another object of the invention is to provide a liquid crystal composition having excellent time-sharing characteristics.

Still another object of the invention is to provide a liquid crystal composition which may be driven at a lower duty ratio than heretofore practical.

Yet another object of the invention is to provide a liquid crystal composition for use in a display device having excellent time-sharing characteristics with a duty ratio down from 1/32 to 1/48, at a low voltage.

Still another object of the invention is to provide a liquid crystal display device of large display capacity and high-quality display which incorporates such liquid crystal compositions.

Yet a further object of the invention is to provide a liquid crystal display device including such liquid crystal compositions and imposing a small load on the driving circuit.

Still other objects and advantages of the invention will in part be obvious and will in part be apparent from the specification.

The invention accordingly comprises a composition of matter possessing the characteristics, properties and relation of constituents which will be exemplified in the compositions hereinafter described, and an article of manufacture possessing these compositions of matter and their features and properties, and will be exemplified in the composition and relation of elements hereinafter described, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE INVENTION

Figures 1A, 1B:
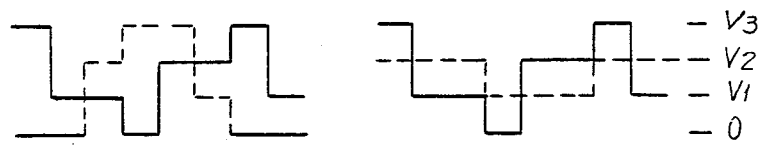
FIGS. 1a–b illustrates selective waveforms for a time-sharing operation, i.e., selective waveforms at (a) and selective half-waveforms at (b)
Figure 2:
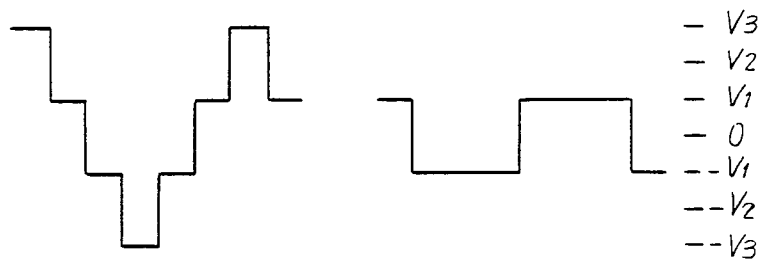
FIG. 2 illustrates the relation between voltage and light transmittance through a liquid crystal cell including the compositions of the invention when the selected waveforms are applied.

FIG. 1 illustrates selective waveforms for time-sharing operation at (a) and half-selective waveforms at (b), and FIG. 2 illustrates the relation between voltage and light transmittance in a liquid crystal cell subject to those waveforms. In FIG. 2, graphs 1 and 2 show the voltage and light transmittance relationships obtained at an angle of 80° and 50° between the liquid crystal cell and the direction of observation (angle of vision) when the selective waveforms (a) and the half-selective waveforms (b) were applied to the cell. Vth-1 and Vth-2 indicate the threshold voltages for a light transmittance of 30 percent and 80 percent, respectively. The driving voltage Vd for operation in a time-sharing mode having satisfactory display contrast and angle of vision is expressed as follows:

$$Vth\text{-}1 \leq Vd < Vth\text{-}2$$

The driving voltage may fluctuate due to factors such as changes in battery voltage during its lifetime and changes in the circuit. The voltage margin, M, defines the allowable fluctuations of the driving voltage, and is expressed as follows:

$$M = \frac{(Vth\text{-}2) - (Vth\text{-}1)}{Vc} \times 100 \, (\%)$$

where Vc is the driving voltage, and Vc is expressed as follows:

$$Vc = \tfrac{1}{2}[(Vth\text{-}2) + (Vth\text{-}1)]$$

Thus, the suitability of a liquid crystal cell for time-sharing operation may be expressed in terms of these parameters.

The selective and half-selective waveforms, however, have an effective voltage ratio which usually decreases with a reduction in duty ratio. This means a decrease in the difference between Vth-1 and Vth-2, and therefore, a reduction in margin M. A further reduction in duty ratio results in Vth-1 becoming greater than Vth-2, and M less than zero. This reduced duty ratio makes a time-sharing operation impossible.

Liquid crystal compositions of the invention may be driven in display devices having a lower duty ratio, and accordingly overcome the shortcoming of the prior art compositions. The compositions in accordance with the invention comprise combinations of the compounds represented by the general formulas (1) to (6):

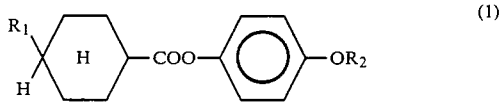

-continued

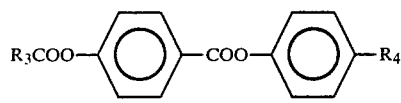
(2)

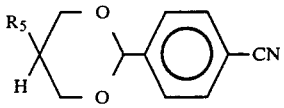
(3)

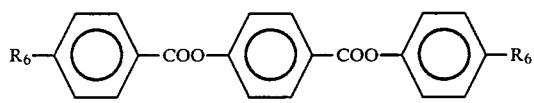
(4)

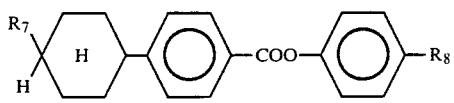
(5)

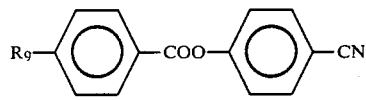
(6)

where $R_1$ is a straight-chain alkyl group having 2 to 6 carbon atoms; $R_2$ is a straight-chain alkyl group having 1 to 6 carbon atoms; $R_3$ is a straight-chain alkyl group having 3 to 6 carbon atoms; $R_4$ is a straight-chain alkyl group having 1 to 5 carbon atoms; $R_5$ is a straight-chain alkyl group having 2 to 8 carbon atoms; $R_6$ is a straight-chain alkyl group having 2 to 4 carbon atoms; $R_7$ is a straight-chain alkyl group having 3 to 5 carbon atoms; $R_8$ is a straight-chain alkyl group having 2 to 7 carbon atoms, and $R_9$ is a straight-chain alkyl group having 2 to 8 carbon atoms.

The compounds of formulas (1) to (6) are stable. Unlike the azoxy liquid crystals, they do not require a yellow filter to prevent deterioration by light, since they do not absorb any light in the visible range. Therefore, they provide a bright display and can be used to provide displays in various colors.

Compounds of formula (1),

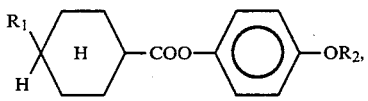

widen the angle of vision for the liquid crystal display device and prevent cross-talk at small angles of vision during the time-sharing operation. These results are further improved if $R_1$ and $R_2$ in the compounds of formula (1) have a total of 8 to 10 carbon atoms.

The compounds of formula (2),

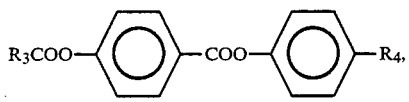

improve the contrast of the display at various angles of vision during the time-sharing operation. Compounds of formula (3),

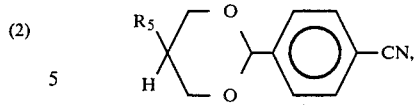

are effective for lowering the driving voltage. The compounds of formula (6),

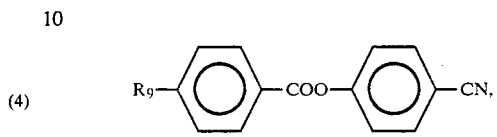

may be used instead of the compounds of formula (3) for lowering the driving voltage. However, in comparison with the compounds of formula (6), the compounds of formula (3) are also effective for widening the angle of vision and preventing cross-talk. The compounds of formula (1) are also effective for these same purposes.

The compounds of formulas (4),

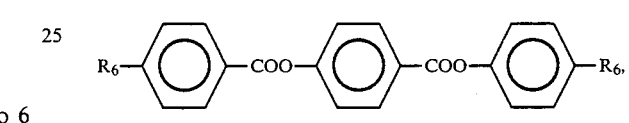

and (5),

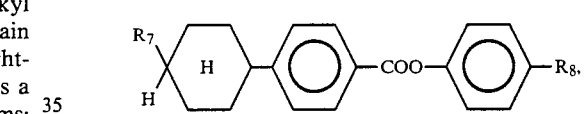

are effective not only for raising the clearing point of the liquid crystal composition, but also for improving the contrast and widening the angle of vision in comparison with a liquid crystal of the general formula:

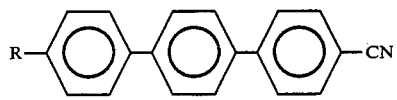

where R stands for a straight-chain alkyl group. The compounds of formula (6) can be used as an alternative for the compounds of formula (3) and are effective for lowering the driving voltage and improving contrast.

The liquid crystal compositions of this invention include compounds of formulas (1) and (2), and at least one of formula (3) and formula (6). The compositions according to the Examples of the invention, which will hereinafter be described with reference to TABLE 2, further include a compound of formula (4) and/or a compound of formula (5). The compounds of formulas (4) and (5) are effective for improving the clearing point of the liquid crystal.

TABLE 1 shows specific examples of the compounds according to formulas (1) to (6).

TABLE 1

|          |   | $R_1$ | $R_2$ | Melting point (°C.) | Clearing point (°C.) |
|----------|---|-------|-------|---------------------|----------------------|
| Compound | 1 | $C_2H_5$ | $C_4H_9$ | 33 | 39 |

TABLE 1-continued

| | | | | Melting point (°C.) | Clearing point (°C.) |
|---|---|---|---|---|---|
| of formula (1) | 2 | $C_3H_7$ | $C_2H_5$ | 47 | 78 |
| | 3 | $C_3H_7$ | $C_4H_9$ | 41 | 71 |
| | 4 | $C_3H_7$ | $C_5H_{11}$ | 37.5 | 66.5 |
| | 5 | $C_4H_9$ | $CH_3$ | 42 | 60 |
| | 6 | $C_4H_9$ | $C_2H_5$ | 35.5 | 74 |
| | 7 | $C_4H_9$ | $C_6H_{13}$ | 27 | 71 |
| | 8 | $C_5H_{11}$ | $CH_3$ | 40 | 69.5 |
| | 9 | $C_5H_{11}$ | $C_5H_{11}$ | 35.5 | 75 |
| | 10 | $C_6H_{13}$ | $C_2H_5$ | 49 | 83 |
| | | $R_3$ | $R_4$ | | |
| Compound of formula (2) | 11 | $C_3H_7$ | $C_2H_5$ | 58 | 38 |
| | 12 | $C_5H_{11}$ | $CH_3$ | 57 | 56.5 |
| | 13 | $C_5H_{11}$ | $C_2H_5$ | 28.5 | 42 |
| | 14 | $C_5H_{11}$ | $C_3H_7$ | 36 | 60 |
| | 15 | $C_5H_{11}$ | $C_5H_{11}$ | 37 | 67 |
| | 16 | $C_6H_{13}$ | $C_5H_{11}$ | 43.5 | 58.5 |
| | | $R_5$ | | | |
| Compound of formula (3) | 17 | $C_2H_5$ | | 66 | 15 |
| | 18 | $C_3H_7$ | | 55 | 42 |
| | 19 | $C_4H_9$ | | 41 | 35 |
| | 20 | $C_5H_{11}$ | | 55 | 47.5 |
| | 21 | $C_6H_{13}$ | | 47 | 40.5 |
| | 22 | $C_7H_{15}$ | | 52.5 | 51 |
| | 23 | $C_8H_{17}$ | | 60 | 51 |
| | | $R_6$ | | | |
| Compound of formula (4) | 24 | $C_2H_5$ | | 91 | 181 |
| | 25 | $C_4H_9$ | | 89 | 173 |
| | | $R_7$ | $R_8$ | | |
| Compound of formula (5) | 26 | $C_3H_7$ | $C_2H_5$ | 97 | 175 |
| | 27 | $C_3H_7$ | $C_5H_{11}$ | 79 | 167 |
| | 28 | $C_3H_7$ | $C_7H_{15}$ | 73 | 160 |
| | 29 | $C_5H_{11}$ | $C_7H_{15}$ | 93 | 138.5 |
| | | $R_9$ | | | |
| Compound of formula (6) | 30 | $C_2H_5$ | | 72 | 43 |
| | 31 | $C_3H_7$ | | 99 | 54 |
| | 32 | $C_4H_9$ | | 66 | 42 |
| | 33 | $C_5H_{11}$ | | 62 | 58 |
| | 34 | $C_6H_{13}$ | | 42 | 47 |
| | 35 | $C_7H_{15}$ | | 43 | 56 |
| | 36 | $C_8H_{17}$ | | 46 | 53 |

Figure 3:
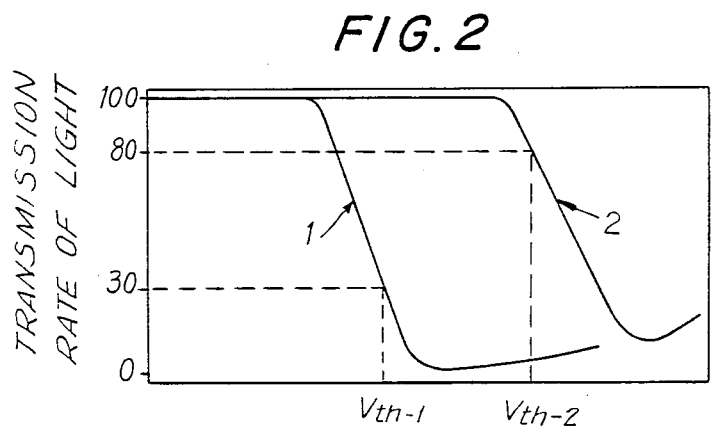
FIG. 3 is a cross-sectional view of a liquid crystal display device including a time-sharing drive circuit and liquid crystal composition in accordance with the invention.

The following examples are set forth to illustrate liquid crystal compositions prepared in accordance with the invention. The examples are set forth by way of illustration only, and not in a limiting sense. FIG. 3 illustrates a liquid crystal display device 10 including a time-sharing drive circuit 11 for applying time-sharing drive signals to a liquid crystal cell 12. Cell 12 includes an upper substrate 13 and a lower substrate 14 spaced apart by a spacer 16 and each having electrodes 17 and 18 disposed on the interior surfaces, respectively. Cell 12 also includes an upper polarizer 20 and a lower polarizer 21 and if necessarily includes a reflecter under the lower polarizer 21. A liquid crystal composition 19 is disposed in the space between substrates 13 and 14, and twisted about 90° (80° to 100°) between substrates 13 and 14. Signals are selectively applied to electrodes 17 and 18, and the voltage drop between cooperating opposed electrodes causes that portion of the liquid crystal material therebetween to be rendered visually distinguishable from the remainder of the liquid crystal material in response to polarized light entering cell 12. At least one of electrodes 17 and 18 is transparent. In a transmissive cell, both electrodes 17 and 18 are transparent.

EXAMPLES 1 TO 5

The liquid crystal compositions of this invention including the compounds shown in TABLE 1 are shown in TABLE 2 together with the characteristics of a display device including the compositions.

TABLE 2

| | | (wt. %) Example | | | | |
|---|---|---|---|---|---|---|
| Compound | | 1 | 2 | 3 | 4 | 5 |
| Compound of formula (1) | 2 | | | | 1.7 | 1.7 |
| | 3 | | | | 4.5 | 4.5 |
| | 4 | 14.0 | 12.3 | 9.2 | 8.2 | 8.2 |
| | 5 | | | | 3.5 | 3.5 |
| | 6 | | | | 3.5 | 3.5 |
| | 7 | 14.0 | 12.3 | 9.2 | 8.2 | 8.2 |
| | 8 | | | | 3.8 | 3.8 |
| | 9 | 19.5 | 17.2 | 12.8 | 11.4 | 11.4 |
| | 10 | 10.5 | 9.2 | 13.8 | 6.2 | 6.2 |
| Compound of formula (2) | 14 | 28.0 | 11.0 | 11.0 | 11.0 | 11.0 |
| | 15 | | 11.0 | 11.0 | 11.0 | 11.0 |
| Compound of formula (3) | 17 | 7.0 | 7.0 | 7.0 | 7.0 | |
| | 18 | | 10.0 | 10.0 | 10.0 | |
| | 19 | 3.5 | | | | |
| Compound of formula (4) | 25 | 3.5 | 10.0 | 8.0 | 10.0 | |
| Compound of formula (5) | 27 | | | 8.0 | | 10.0 |
| Compound of formula (6) | 30 | | | | | 11.0 |
| | 32 | | | | | 6.0 |
| Clearing point (°C.) | | 55.0 | 58.0 | 60.0 | 57.0 | 65.0 |
| −30° C., four days | | o | o | o | o | o |
| Vth - 1 (V) | | 10.53 | 7.92 | 7.89 | 7.79 | 7.73 |
| Vth - 2 (V) | | 11.02 | 8.11 | 8.04 | 7.91 | 7.81 |
| M(25° C., %) | | 4.5 | 2.4 | 1.9 | 1.5 | 1.0 |
| Response time at 25° C. (m sec) | τR | 150 | 180 | 180 | 160 | 150 |
| | τF | 130 | 170 | 170 | 150 | 130 |

In TABLE 2, the designation "o" indicates that crystallization did not take place, even when the cells containing the compositions of this invention had been left to stand at a temperature of −30° C. for four hours. The values of Vth-1, Vth-2, M and response time were obtained by driving the cells at a duty ratio of 1/32. The devices were driven in a time-sharing mode with a duty ratio of 1/N (N being a positive integer), in such a manner that the voltages applied during the non-selected and selected periods would have a ratio of 1:($\sqrt{N}+1$). Satisfactory display contrast and angle of vision were obtained in all of the examples. The compounds (2)–(10), (14), (15), (17)–(19), (25), (27), (30) and (32) in TABLE 2 correspond to the compounds identified in TABLE 1. The examples will now be described in further detail.

Example 1 is directed to a liquid crystal composition including mainly compounds of formula (1) having a total of at least eight carbon atoms at $R_1$ and $R_2$ (58.0% by weight) and a compound of formula (2) (28.0% by weight). Example 1 further contains compounds of formula (3) having positive dielectric anisotropy and a compound of formula (4) which improves the clearing point of the liquid crystal composition. Although the composition has threshold voltages exceeding 10 V, it has a better margin (4.5%) than in any other Example and permits time-sharing operation even at a duty ratio of 1/48. When the composition of Example 1 was driven at a duty ratio of 1/48, it had a threshold voltage Vth-1 of 12.68 V, a threshold voltage Vth-2 of 12.89 V and a margin M of 1.6%.

Examples 2 and 3 are directed to compositions similar to that of Example 1, but contain compounds of formula (3) in a larger quantity (17.0%) than in Example 1

(10.5%). Example 3 also includes a compound of formula (5). Examples 2 and 3 each have a driving voltage of about 8 V, which is lower than in Example 1. Example 1, however, has a higher response speed. As regards the compounds of formulas (4) and (5) used for controlling the clearing point, 3.5% of a formula (4) compound was used in Example 1, 10.0% of a formula (4) compound in Example 2, and a total of 16.0% of formulas (4) and (5) compounds in Example 3. The increase in the quantity of formula (4) and (5) compounds from Examples 1 to 3 coincides with a rise in the clearing point of the resulting compositions, i.e., 55.0° C. in Example 1, 58.0° C. in Example 2, and 60.0° C. in Example 3.

Example 4 had a positive margin of 1.5% at a duty ratio of 1/32. A comparison of Example 4 with Example 2 provides an understanding of the effects on the margin M of the compounds of formula (1) in which the groups $R_1$ and $R_2$ have a total of at least eight carbon atoms. The composition of Example 4 is the same as that of Example 2 with respect to the compounds of formulas (2), (3) and (4) and the total quantity (51.0% by weight) of the compounds of formula (1). The compositions differ from each other in the details of the compounds according to formula (1). In Example 2, all of the compounds of formula (1) have a total of eight to ten carbon atoms in the straight-chain alkyl groups $R_1$ and $R_2$. The compounds of formula (1) employed in Example 4 have a total of eight to ten carbon atoms in $R_1$ and $R_2$ in only 34.0% by weight of the whole composition. In both Examples 2 and 4, the quantities of the compounds according to formula (1) total 51.0% by weight. Accordingly, Example 2 shows a driving margin M of 2.4%, which is higher than the 1.5% in Example 4. Example 4 shows a lower driving voltage and a higher response speed than Example 2.

Example 5 is directed to a composition similar to that of Example 4, but containing esters of formula (6) having cyano groups, instead of the compounds of formula (3). Example 5 has a positive margin M of 1.0% and teaches that the use of such esters also provides a liquid crystal composition suitable for high-duty operation. Example 4, however, shows a driving margin M of 1.5%, which is greater than the 1.0% in Example 5, although Example 5 shows a higher clearing point and a faster response speed than Example 4.

In the event a particular composition contains both of the compounds of formulas (3) and (6), its time-sharing operation characteristics lie between those of Examples 4 and 5, and closer to those of Example 5 if it contains the compound of formula (6) in a larger quantity than that of formula (3). If it contains the compound of formula (3) in a larger quantity than that of formula (6), its characteristics lie between the results of Examples 4 and 5 and closer to those of Example 4. Its characteristics lie halfway between the results of Examples 4 and 5 if it contains the compounds of formulas (3) and (6) in equal proportions. The fact that the compound of formula (4) is used in Example 4, while Example 5 employs the compound of formula (5), does not make any significant difference, since those compounds are substantially equal in function.

The compounds of formulas (4) and/or (5) are added to adjust the clearing point of the composition. Other compounds, such as terphenyl, are also effective for the same purpose. The compounds of formulas (4) and/or (5) are also useful for obtaining improved contrast and enlarged range of vision. Hence, their incorporation into the compositions of the invention is preferred.

The liquid crystal compositions according to Examples 1 to 5 of this invention contain at least one compound of each of formulas (1) and (2), which makes it possible to obtain a positive margin in operation at a duty ratio of 1/32. As is seen from Examples 1 to 5, the liquid crystal compositions of this invention are useful, since they do not undergo crystallization at low temperature, have a high clearing point, and are usable over a wide range of temperatures. These advantages are due to the fact that the liquid crystal compositions of this invention contain at least one compound of each of formulas (1) and (2), as in Examples 1 to 5.

The liquid crystal compositions of Examples 1 to 4 contain not only at least one compound of each of formulas (1) and (2), but also at least one compound of formula (3) and at least one of the compounds according to formulas (4) and (5). They have, therefore, a high driving margin M. It is possible to produce a liquid crystal composition suitable for use with a low duty ratio drive by including a compound of formula (6) instead of the compound of formula (3), as shown in Example 5. A liquid crystal composition suitable for low duty ratio can also be obtained by including a compound of formula (3) instead of the compound of formula (6), as in Example 1. All of the compositions of Examples 1 to 4 show a higher margin M than the composition of Example 5. The higher margin is, thus, apparently due to the presence of at least one compound of formula (3).

The liquid crystal compositions of Examples 1 to 5 comprise by weight mainly compounds of formula (1), especially those in which the straight-chain alkyl groups $R_1$ and $R_2$ have a total of eight to ten carbon atoms. As can be seen from TABLE 2, the compounds of formula (1) in which the straight-chain alkyl groups $R_1$ and $R_2$ have a total of eight to ten carbon atoms (i.e., compounds 4, 7, 9 and 10 in TABLE 2) account for 58.0% by weight of the composition in Example 1, 51.0% by weight in Example 2, 45.0% by weight in Example 3, and 34.0% by weight in Examples 4 and 5. The percentage of compounds of formula (1) in each Example decreases in sequential order from Example 1 through Example 5. This same relative decrease is observed in the driving margin M, which is highest in Example 1 and decreases through Example 5. Example 4, in which the compounds of formula (3) are used instead of those of formula (6), shows a higher margin M than Example 5.

The liquid crystal composition of Example 1 has a higher driving margin than that of any other Example and shows a positive value M even if it is driven at a duty ratio of not only 1/32, but also as low as 1/48. These results indicate that it is possible to obtain a liquid crystal composition having a high driving margin M if the proportions of the compounds according to formulas (1) to (6) are appropriately adjusted.

All of the compositions of Examples 1 to 5 show a positive driving margin M at a duty ratio of 1/32 and are useful for application at a low duty ratio. It is contemplated that numerous satisfactory liquid crystal compositions will be obtained experimentally or theoretically in view of the results of Examples 1 to 5. Their advantages and disadvantages can be analyzed in view of various factors, including driving margin, driving voltage and cost of the liquid crystal material. A particular composition which is most suitable for a particular application can accordingly be selected.

The liquid crystal compositions of this invention also have the advantage of providing a satisfactory response speed, which according to Examples 1 to 5, is in the order of 100 m sec. at 25° C. when driven at a duty ratio of 1/32.

The compositions of this invention require only a low driving voltage of about 10 V at room temperature, even when driven at a duty ratio of 1/32. Low voltage is advantageous not only in allowing for simplification of the power source and reduction in size of the device, but also in facilitating the manufacture of an integrated circuit for driving a display device. The integrated circuit is usually fabricated from a CMOS (complementary metal oxide semiconductor) because of the ease of fabrication and low power consumption, but the circuit is very difficult to fabricate if a high driving voltage is involved. The liquid crystal compositions of this invention, which do not require a particularly high driving voltage, facilitate the fabrication of a CMOS driving circuit at a high yield and a low cost. Thus, use of the liquid crystal compositions of this invention provides an improved display and provides advantages in the driving circuit for the display device.

Liquid crystal display devices including the liquid crystal compositions of this invention have excellent time-sharing characteristics which provide satisfactory time-sharing operation with a duty ratio down to 1/32, or even 1/48 at a low voltage. The devices provide a large-capacity display of high quality and permit a bright or colored display, since they do not require any yellow filter. The devices of this invention are thus of great practical value.

It will thus be seen that the objects set forth above, among those made apparent from the preceding description, are efficiently attained, and since certain changes may be made in carrying out the above process, in the described product, and in the constructions set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Particularly it is to be understood that in said claims, ingredients or compounds recited in the singular are intended to include compatible mixtures of such ingredients wherever the sense permits.

What is claimed is:

1. A liquid crystal composition comprising at least one compound of each of formulas (1) and (2), and at least one of the compounds of formulas (3) and (6):

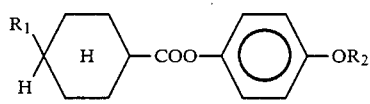

(1)

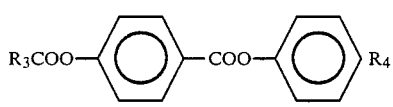

(2)

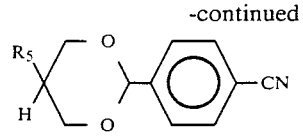

(3)

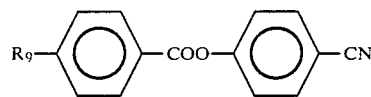

(6)

where $R_1$ is a straight-chain alkyl group having 2 to 6 atoms; $R_2$ is a straight-chain alkyl group having 1 to 6 carbon atoms; $R_3$ is a straight-chain alkyl group having 3 to 6 carbon atoms; $R_4$ is a straight-chain alkyl group having 1 to 5 carbon atoms; $R_5$ is a straight-chain alkyl group having 2 to 8 carbon atoms, and $R_9$ is a straight-chain alkyl group having 2 to 8 carbon atoms, and including about 40 to 65 weight percent of compounds of formula (1), about 20 to 30 weight percent of compounds of formula (2), and when present about 7 to 20 weight percent of compounds of formula (3) and when present about 7 to 20 weight percent of compounds of formula (6).

2. A liquid crystal composition as described in claim 1, wherein said compounds of formula (1) comprise compounds wherein said groups $R_1$ and $R_2$ have a total of eight to ten carbon atoms.

3. A liquid crystal composition as described in claim 1, further comprising at least one of the compounds of formulas (4) and (5):

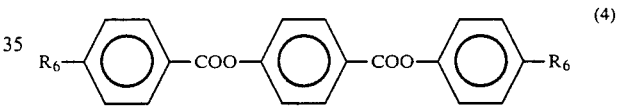

(4)

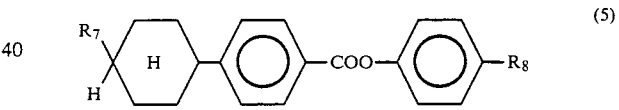

(5)

where $R_6$ is a straight-chain alkyl group having 2 to 4 carbon atoms; $R_7$ is a straight-chain alkyl group having 3 to 5 carbon atoms; and $R_8$ is a straight chain alkyl group having 2 to 7 carbon atoms, and when present about 3 to 12 weight percent of compounds of formula (4) and when present about 5 to 15 weight percent of compounds of formula (5).

4. A liquid crystal composition as described in claim 3, wherein said compounds of formula (1) comprise compounds wherein said groups $R_1$ and $R_2$ have a total of eight to ten carbon atoms.

5. A liquid crystal composition as described in claim 2, wherein from about 34 to about 100 weight percent of compounds of formula (1) are those wherein said groups $R_1$ and $R_2$ have a total of eight to ten carbon atoms.

6. A liquid crystal composition as described in claim 2, wherein $R_1$ of the compound of formula (1) is selected from the group consisting of $C_3H_7$; $C_4H_9$; $C_5H_{11}$ and $C_6H_{13}$.

7. A liquid crystal composition as described in claim 6, wherein $R_2$ of the compound of formula (1) is selected from the group consisting of $C_5H_{11}$; $C_6H_{13}$ and $C_2H_5$.

8. A liquid crystal composition as described in claim 2, wherein $R_3$ of the compound of formula (2) is $C_5H_{11}$.

9. A liquid crystal composition as described in claim 2, wherein $R_4$ of the compound of formula (2) is selected from the group consisting of $C_3H_7$ and $C_5H_{11}$.

10. A liquid crystal composition as described in claim 6, wherein $R_5$ of the compound of formula (3) is selected from the group consisting of $C_2H_5$; $C_3H_7$ and $C_4H_9$.

11. A liquid crystal composition as described in claim 8, wherein $R_9$ of the compound of formula (6) is selected from the group consisting of $C_2H_5$ and $C_4H_9$.

12. A liquid crystal composition as described in claim 3, comprising about 58 weight percent of compounds of formula (1), about 28 weight percent of compounds of formula (2), about 10.5 weight percent of compounds of formula (3), and about 3.5 weight percent of compounds of formula (4).

13. A liquid crystal composition as described in claim 3, comprising about 51.0 weight percent of compounds of formula (1), about 22.0 weight percent of compounds of formula (2), about 17.0 weight percent of compounds of formula (3), and about 10.0 weight percent of compounds of formula (4).

14. A liquid crystal composition as described in claim 3, comprising about 45.0 weight percent of compounds of formula (1), about 22.0 weight percent of compounds of formula (2), about 17.0 weight percent of compounds of formula (3), about 8.0 weight percent of compounds of formula (4), and about 8.0 weight percent of compounds of formula (5).

15. A liquid crystal display device adapted for time-sharing operation with a duty ratio of about 1/32 at a voltage of about 10 V or below at room temperature, including a liquid crystal composition as described in claim 1.

16. A liquid crystal display device adapted for time-sharing operation with a duty ratio in the range of about 1/32 to 1/48, including a liquid crystal composition as described in claim 1.

17. A liquid crystal display device adapted for time-sharing operation with a duty ratio down to about 1/32 at a voltage of about 10 V or below at room temperature, including a liquid crystal composition as described in claim 2.

18. A liquid crystal display device adapted for time-sharing operation with a duty ratio in the range of about 1/32 to 1/48, including a liquid crystal composition as described in claim 2.

19. A liquid crystal display device adapted for time-sharing operation with a duty ratio down to about 1/32 at a voltage of about 10 V or below at room temperature, including a liquid crystal composition as described in claim 3.

20. A liquid crystal display device adapted for time-sharing operation with a duty ratio in the range of about 1/32 to 1/48, including a liquid crystal composition as described in claim 3.

21. A liquid crystal display device comprising two opposed substantially parallel substrates with liquid crystal electrodes selectively disposed on the interior surface thereof, a liquid crystal composition in the space between the substrates, time-sharing circuit means for generating time-sharing signals to be selectively applied to the liquid crystal electrodes for operating a liquid crystal display in a time-sharing mode, the liquid crystal composition comprising at least one compound of each of formula (1) and (2), and at least one of the compounds of formulas (3) and (6):

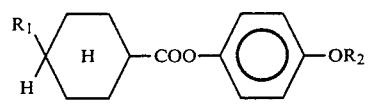

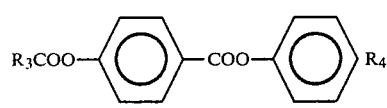

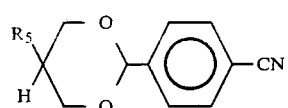

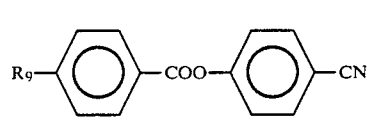

wherein $R_1$ is a straight-chain alkyl group having 2 to 6 carbon atoms; $R_2$ is a straight-chain alkyl group having 1 to 6 carbon atoms; $R_3$ is a straight-chain alkyl group having 3 to 6 carbon atoms; $R_4$ is a straight-chain alkyl group having 1 to 5 carbon atoms; $R_5$ is a straight-chain alkyl group having 2 to 8 carbon atoms, and $R_9$ is a straight-chain alkyl group having 2 to 8 carbon atoms, and including about 40 to 65 weight percent of compounds of formula (1), about 20 to 30 weight percent of compounds of formula (2), and when present about 7 to 20 weight percent of compounds of formula (3) and when present about 7 to 20 weight percent of compounds of formula (6).

22. A liquid crystal display device as set forth in claim 21, wherein said formula (1) compounds are those in which said groups $R_1$ and $R_2$ have a total of eight to ten carbon atoms.

23. A liquid crystal display device as set forth in claim 21, further containing at least one of the compounds represented by formulas (4) and (5):

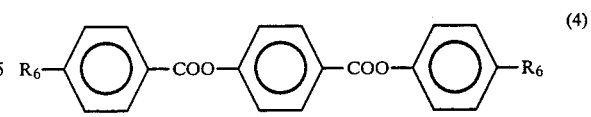

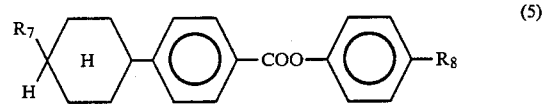

wherein $R_6$ is a straight-chain alkyl group having 2 to 4 carbon atoms; $R_7$ is a straight-chain alkyl group having 3 to 5 carbon atoms; and $R_8$ is a straight-chain alkyl group having 2 to 7 carbon atoms, and when present about 3 to 12 weight percent of compounds of formula (4) and when present about 5 to 15 weight percent of compounds of formula (5).

24. A liquid crystal display device as set forth in claim 21, wherein said time-sharing circuit means operates with a duty ratio down to about 1/32 at a voltage of about 10 V or below at room temperature.

25. A liquid crystal display device as set forth in claim 21, wherein said time-sharing circuit means operates with a duty ratio in the range of about 1/32 to 1/48.

* * * * *